United States Patent Office 3,027,051
Patented Mar. 27, 1962

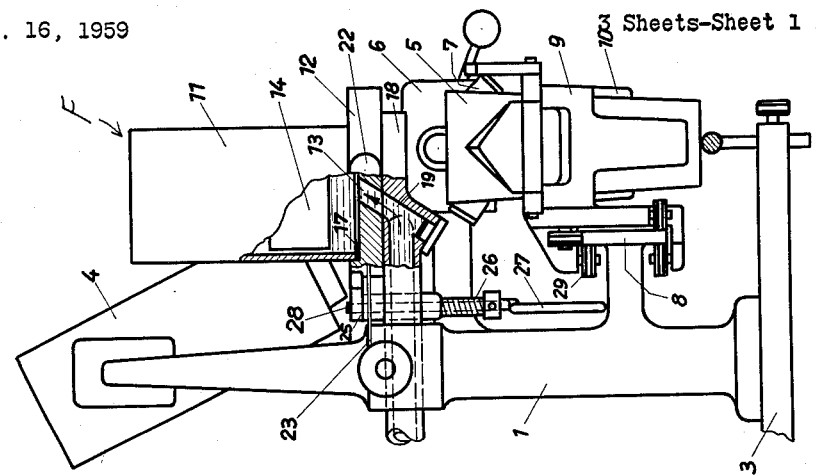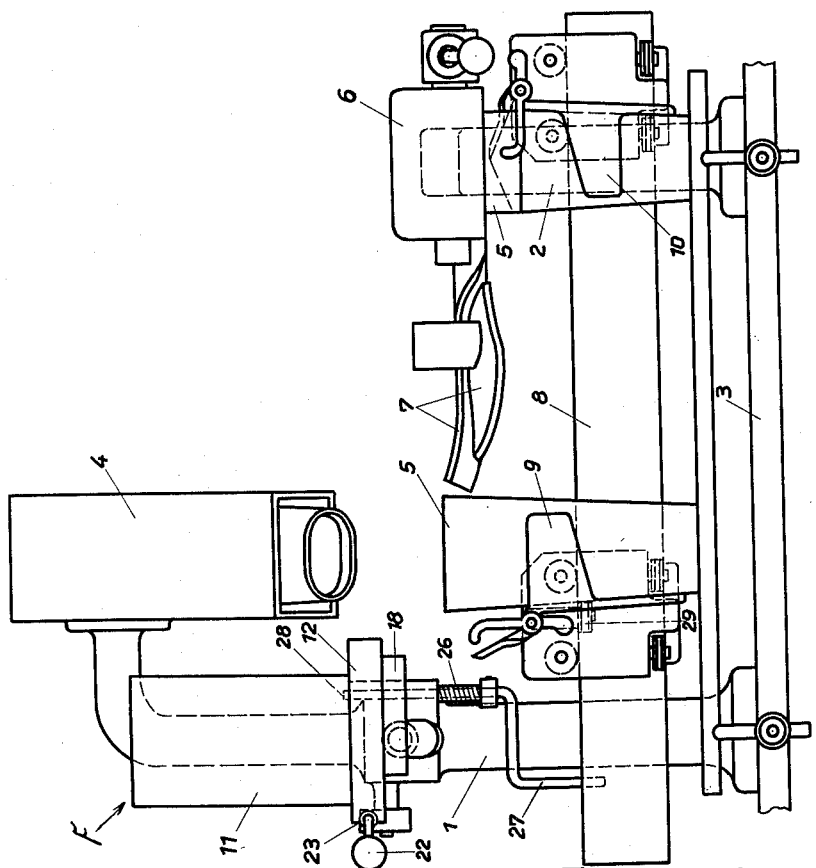

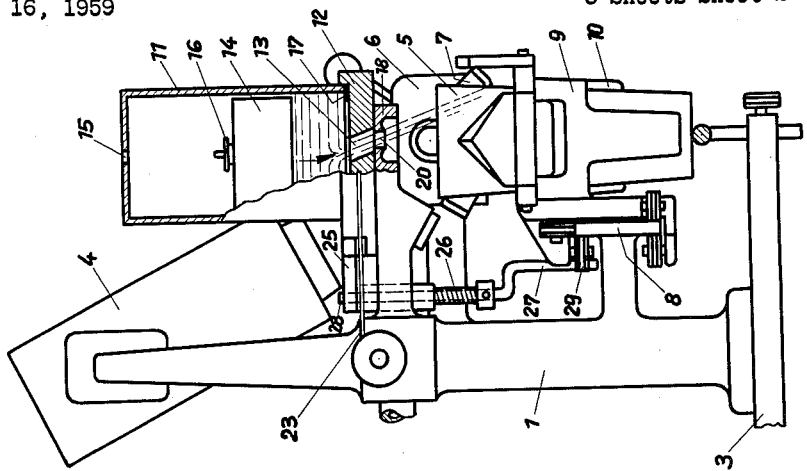
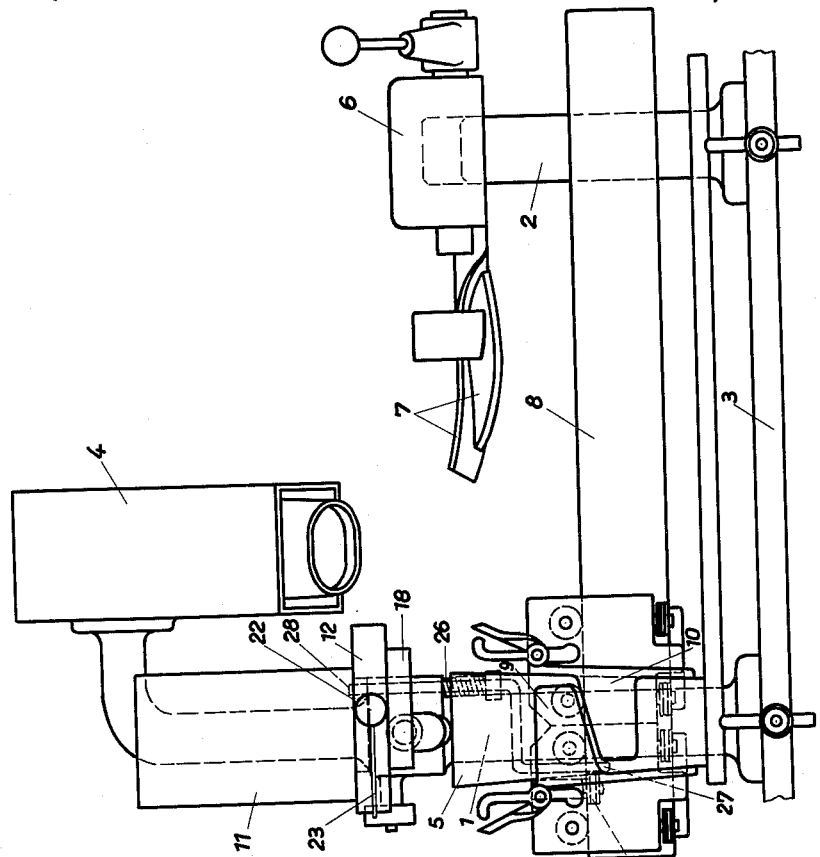

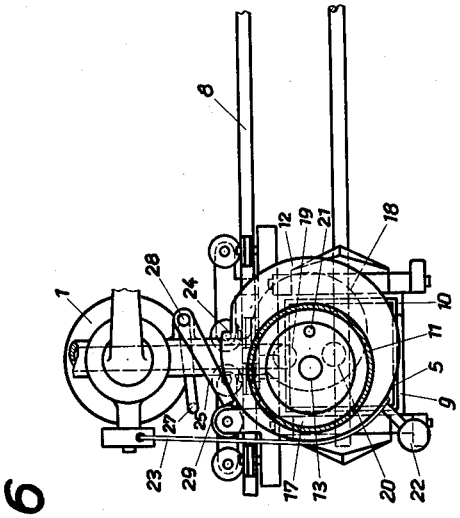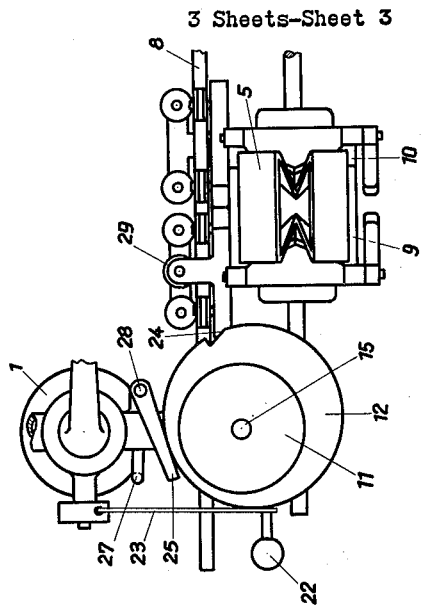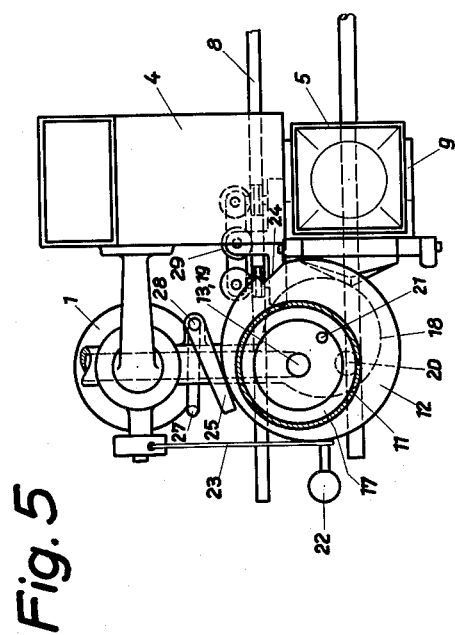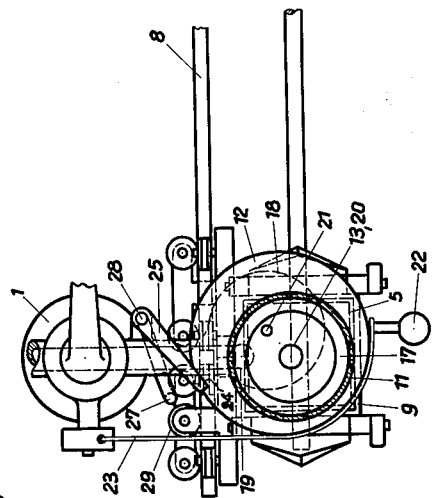

3,027,051
APPARATUS FOR DELIVERING LIQUIDS
Hans Zerlin, Dusseldorf, Germany, assignor to Jagenberg-Werke Akt.-Ges., Dusseldorf, Germany
Filed Feb. 16, 1959, Ser. No. 793,409
Claims priority, application Germany Oct. 18, 1958
3 Claims. (Cl. 222—162)

The present invention relates to means for dispensing liquids.

More particularly, the invention is directed to an apparatus for dispensing liquids such as milk or the like in which a measuring vessel is connected alternately with an inlet opening through which the milk is admitted to the measuring vessel and with an outlet opening through which the contents of the measuring vessel are discharged into suitable container means.

Apparatus has heretofore been provided in which the liquid contents may be dispensed in the amount or quantity to be delivered, wherein the amount to be delivered may be determined by a piston which is reciprocable in an upward and downward direction in a measuring vessel or container. Generally such an apparatus meets the requirements placed thereon in respect to the accuracy of the contents being delivered. However, the means necessary for the sequential operation of the piston and of the inlet and outlet valve means presents troublesome problems with respect to the means for imparting movement to the piston and for the control of the inlet and outlet valve means.

It is also known in the art to employ so-called gravity fillers or dispensers which function on the principal of drainage and in which assemblies, the valve means are also operated sequentially by floats or spring pressure. Experience has demonstrated clearly that such gravity fillers or dispensers possess unwanted inaccuracies in the dispensing process. A further objectionable characteristic resides in the fact that the liquid makes contact with air during the measuring cycle and the ultimate result thereof produces the deleterious effect of forming a heavy foam, particularly when milk is the liquid being dispensed.

A primary object of this invention is to provide an apparatus for delivering liquid such as milk, which overcomes the above mentioned and other disadvantages.

Another object of the invention is to provide an apparatus in which a measuring vessel includes a floating piston guided in the measuring vessel and the admission and discharge of the contents to and from the vessel is regulated by the floating piston, thereby obviating the necessity of employing any drive means for operative connection to the piston, so that the piston functions as a float component during the filling cycle of the measuring vessel and as a piston during the discharge or dispensing cycle.

Yet another object of the present invention is to provide a liquid dispensing apparatus in which the floating piston possesses the advantages of the simple construction of a gravity dispenser and the dispensing accuracy of a piston type dispenser.

More specifically, to accomplish the above and other advantageous objects, the filling and discharging of the measuring vessel, which vessel is suitable supported on a base component, is achieved by the bottom of the measuring vessel being provided with an opening serving the dual purposes of inlet and outlet means, with the opening being alternately operably connected with an inlet opening and an outlet opening formed in a supporting component by a relative swinging movement with respect to the measuring vessel or the supporting component. The completion of the filling cycle is determined by the floating piston, which, under the influence of its upward pressure closes vent means provided in the measuring vessel to arrest further admission of liquid into the vessel. Following the filling cycle, the dispensing of the liquid contents is performed in such a fashion that the outlet opening of the supporting component is brought into registry with the opening of the measuring vessel so that the gravity action of the floating piston causes the discharge of the liquid contents. To obtain an efficient sealing of the measuring vessel, the floating piston includes sealing means on its upper face serving to close the vent of the vessel and sealing means on its lower face to close the discharge opening of the vessel.

The movement of the apparatus from the filling position to the dispensing position is achieved by the action of a "counter force," which force is effected by the tensioning of a spring means. Following completion of the dispensing or discharging cycle, the apparatus is returned automatically to the filling position by the releasing of the spring means and to maintain the apparatus in its proper position during discharging or dispensing, and prevent the spring action from becoming effective, an automatically operable locking mechanism is provided, which is released upon the removal of a filled container, whereby the reversed movement of the apparatus to the filling position occurs by virtue of the influence of the released spring action.

Further objects and advantages of the invention will become more readily apparent to one skilled in the art from a study of the following detailed description and the annexed drawings and in which drawings:

FIGURE 1 is a front elevational view of an apparatus constructed in accordance with the present invention.

FIGURE 2 is a side elevational view partly in cross section of the apparatus shown in FIGURE 1, FIGURE 3 is an elevational view along the lines of that shown in FIGURE 1 and illustrating the components in the filling or dispensing position, FIGURE 4 is a side elevational view partly in cross section of the apparatus shown in FIGURE 3 and, FIGURES 5 to 8 inclusive are plan views showing different operative steps in the functioning of the apparatus.

With reference to FIGURES 1 to 4, there is shown a suitably supported base plate 3 which is provided with two laterally spaced pillars or columns 1 and 2 and mounted on the pillar 1 are the present filling apparatus denoted generally F, and a supply source 4 for a stack of nested containers 5 to be filled. The column 2 carries a heat and pressure applying means 6 shown and described in Patent No. 2,888,794 issued June 2, 1959, together with a folding blade assembly 7, which assembly functions to complete the folding of the closure for the container. The pillars or columns 1 and 2 also support a guide rail 8 serving to support cell components 9 and 10 for receiving a container 5. The construction and operation of the cell components 9 and 10, which coact to provide a unitary cell are shown and described in Patent No. 2,932,140, issued April 12, 1960, and Patent Nos. 2,888,794 and 2,932,140 are owned by the Assignee of this application.

The present filling apparatus comprises an open ended measuring vessel or cylinder 11 and a base plate 12 provided with an angularly disposed central opening 13. The cylinder 11 is adapted to be connected to the base plate 12 by means of complemental screw threads on the cylinder and the base plate so that the measuring cylinder can be replaced by another cylinder of either greater or smaller capacity. A hollow body defining a floating piston 14 is located within the cylinder or vessel 11 and the outer diameter of the piston is slightly less than the inner diameter of the cylinder to allow the piston to be displaced upwardly and downwardly therein. A vent opening 15 is provided in the top or closed wall of the cylinder 11 and the vent opening is adapted to be opened and closed by means of a seal component 16 carried by the top face of the floating piston 14. The lower or under face of the piston 14 functions to open and close the opening 13 in the plate 12 by its coaction with a sealing ring 17 located at the lower end of the cylinder 11.

The measuring cylinder 11 and the base plate 12, as an entity is supported by a stationary mounting plate 18 and the plate 18 is formed with inlet and outlet openings 19 and 20 respectively. The plate 12 is swingably mounted upon the mounting plate 18 by pivot means 21 (FIGURE 5) and to effect such swinging movement, the base plate 12 has associated therewith a manually operable handle 22. The free end of a return spring means 23 cooperates with the base plate 12 in the zone of the handle 22 and the spring means 23 is placed under tension by virtue of the swinging movement of the base plate 12 and the measuring cylinder 11. Furthermore, the base plate 12 is formed with a notch or recess 24 adapted to be engaged by a locking lever 25. The lever 25 is carried by a vertically disposed shaft 28 having associated therewith a coil spring 26 and the shaft 28 also carries or has integral therewith a release lever 27 as shown in FIGURES 1 and 5. The release lever 27 is actuated by means of a roller 29 carried by the cell components 9, 10 (FIGURES 2 and 4), which holds the container 5 to be filled.

While the mode of operation of the present apparatus is believed to be readily apparent from the foregoing, it may be summarized as follows:

With the apparatus in the position illustrated in FIGURES 1, 2 and 5, in which position the opening 13 in the base plate 12 registers with the inlet opening 19 of the mounting plate 18, the piston 14 is displaced upwardly by virtue of the liquid entering the interior of the measuring cylinder 11 as shown by the arrow in FIGURE 2. At the end of the upward movement of the piston 14, the sealing component 16 closes the vent opening 15 in the closed wall of the cylinder 11 thereby arresting any further admission of liquid into the cylinder 11.

After a container 5 to be filled with liquid has been positioned below the outlet opening 20 of the mounting plate 18, the liquid filled cylinder 11 (FIGURE 6) is swung by actuation of the handle 22 under a simultaneous tension of the spring means 23, about the pivot means 21 until the opening 13 registers with the outlet opening 20 in the mounting plate 18. In this position, as illustrated in FIGURES 3, 4 and 7, the spring influenced locking lever 25 engages the notch 24 in the base plate 12 to secure the cylinder 11 in this position. The liquid contents of the cylinder 11 now flow from the cylinder under the action of the descending piston 14 as indicated by the arrow in FIGURE 4 through openings 13 and 20 into the container 5. Consequently, piston 14 effects a complete dispensing of the measuring cylinder or vessel 11 and at the end of its downward stroke, the bottom or lower face of the piston 14 rests on the sealing ring 17, thus closing the opening 13 in the plate 12 and preventing a subsequent dripping of the liquid adhering to the interior wall of the cylinder 11.

With reference to FIGURE 8, the thus filled container 5 is removed from the filling zone by a displacement of cell components 9, 10 and the container is moved to the heat and pressing applying means 6 in the fashion shown and described in Patent No. 2,888,794 and Patent No. 2,932,140. By virtue of the displacement of the cell components 9, 10, the roller 29 carried by such components contacts release lever 27, thereby actuating the locking lever 25 to remove the locking lever from the notch 24. When the lever 25 is removed from the notch 24, the return spring means 23 becomes effective to initiate a reverse swinging movement of the cylinder 11 and base plate 12 so that at the end of such swinging movement, the apparatus is again in the position shown in FIGURES 1, 2 and 5 or the starting position, whereupon a new filling cycle can be started.

It is to be understood that the invention is not to be confined to any strict conformity with the showings in the drawings but changes or modifications may be made therein provided such changes or modifications mark no material departure from the spirit and scope of the appended claims.

What I claim is:

1. An apparatus for delivering liquids comprising a measuring vessel having an opening therein, first means defining a liquid inlet and a liquid outlet for the filling and delivering of the liquid respectively, a hollow body defining a floating piston positioned within the measuring vessel and having an outer diameter slightly less than the inner diameter of said vessel, with the opening being adapted to be placed alternately into registry with the liquid inlet and liquid outlet, second means normally urging the vessel to a position in which the opening registers with the liquid inlet whereby the inflowing liquid causes the hollow body to rise until the liquid reaches a predetermined level in the vessel, and further means moving the vessel to a position in which the opening registers with the liquid outlet after the vessel has been filled with liquid whereby the hollow body descends displacing the liquid from the vessel through the liquid outlet, and said second means automatically returning the vessel to the position in which the opening and liquid inlet are in registry after the liquid contents have been delivered.

2. An apparatus as claimed in claim 1, in which said second means normally urging the vessel to the position in which the opening registers with the liquid inlet includes a spring operably associated with the vessel.

3. An apparatus as claimed in claim 2, further including means for locking said vessel in the position in which the opening and liquid outlet are in registry and further means to release said locking means when the liquid contents of the vessel has been delivered.

References Cited in the file of this patent

UNITED STATES PATENTS

| | | |
|---|---|---|
| 252,644 | Blum | Jan. 24, 1882 |
| 720,492 | Sedberry | Feb. 10, 1903 |
| 1,193,842 | Stephan | Aug. 8, 1916 |
| 2,321,241 | Quick | June 8, 1948 |

FOREIGN PATENTS

Great Britain (Provisional Specification) 761,818, Nov. 21, 1956.